Figure 6:
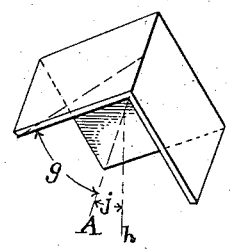

Feb. 4, 1936. C. A. JAMES 2,029,375
REFLECTOR
Original Filed Feb. 26, 1931  2 Sheets-Sheet 1
Fig.1.
Fig.2.
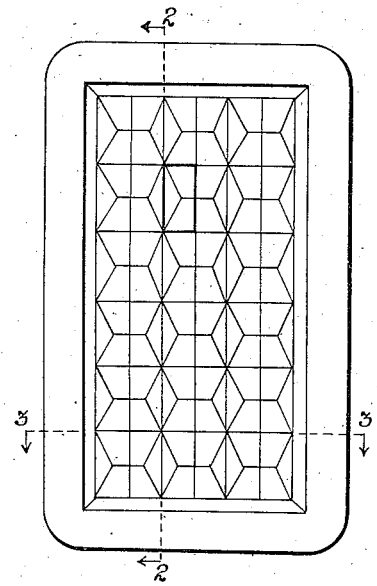
Fig.3.
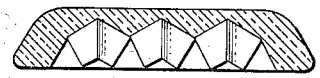
Fig.4.
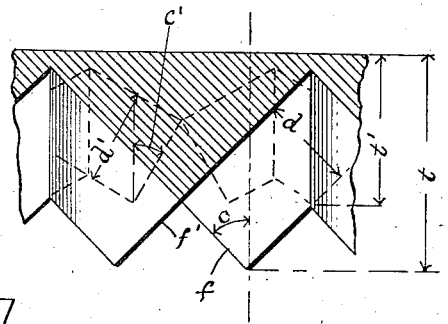
Fig.5.
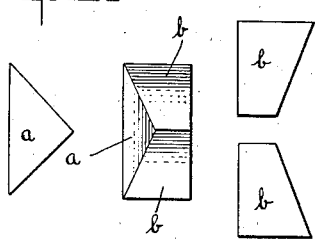
WITNESSES
INVENTOR
Cleveland A. James
BY
Joshua R. H. Potts
HIS ATTORNEY Feb. 4, 1936.     C. A. JAMES     2,029,375
REFLECTOR
Original Filed Feb. 26, 1931    2 Sheets-Sheet 2

WITNESSES

INVENTOR
Cleveland A. James.
BY
HIS ATTORNEY

Patented Feb. 4, 1936

2,029,375

UNITED STATES PATENT OFFICE 2,029,375

REFLECTOR

Cleveland A. James, Philadelphia, Pa., assignor to W. P. Montgomery, Atlantic City, N. J., and John M. Zerbey, Philadelphia, Pa.

Application February 26, 1931, Serial No. 518,348
Renewed May 22, 1935

12 Claims. (Cl. 88—78)

This invention relates to reflectors and particularly to reflectors of such types as return light back to its source.

The reflectors embraced in this application may be made of pressed glass, or they may be of the type known as "hollow reflectors" which are made up of plates of polished metal, silvered glass, or other material.

The reflectors contemplated by this invention may be used in highway traffic signs, either as a beacon indicating danger or the necessity for caution, or they may be used as letters in such signs, all of which are illuminated by the light from the headlights of an approaching vehicle.

The reflectors embodying the principles of this invention may also be used in roadway signs or in signs illuminated by flood lights properly placed; or they may be used as auxiliary tail-lights on vehicles, or as clearance lights.

The light reflected from the reflectors may be either clear or any color, depending on the screen used with hollow reflectors, or upon the color of the glass in solid pressed glass reflectors.

Many years ago, it was well-known that three surfaces placed at right angles to one another would return a reflected ray of light in a path parallel to that of the incident ray. In this connection reference may be had to Zeitschrift für Instrumentkunde by Doctor A. Beck, of Riga, Germany, November 1887, pages 380–389, and United States Letters Patent to Straubel, Nos. 835,648, November 13, 1906. and 897,174, August 25, 1908.

The principle as disclosed by these references was first applied in "central triple reflectors". A central triple reflector is a reflector having three reflecting surfaces of the same size and shape, arranged symmetrically about an axis, the three surfaces being at right angles to each other.

In a solid or pressed glass reflector, a central triple reflector would represent the three sides and the corner of the cube.

Other forms of the triple reflector have been used, (see patent of the applicant herein, granted September 1, 1925, No. 1,552,166) which shows a triple reflector with a rectangular orifice.

The object of the present invention is to provide a reflector which will return a maximum of light back towards its source, not only when the light rays are parallel to the axes of the reflector units, but when the source of the light is to the right or left of, or above or below, the normal to the general plane of the reflector.

Another object of the invention is to provide a glass reflector which can be made with minimum thickness.

Still another object of the invention is to provide a reflector which can be made from inexpensive molds and which will press the glass reflector with minimum distortion.

According to the invention the reflector comprises an extended area, the surface of which is made up or compiled from a plurality or repetition of reflecting units, each unit consisting of three reflecting surfaces, one of the surfaces being in the form of an isosceles right triangle, the other two being trapezoids, and each of the surfaces being at right angles to the other two.

Figure 7:
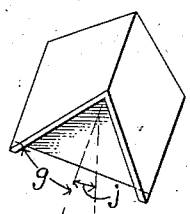
Figure 8:
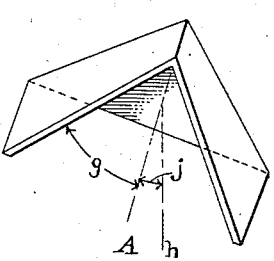
Figure 9:
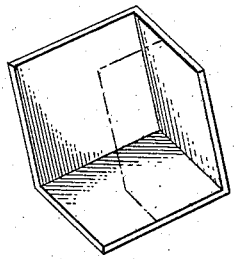
Figure 10:
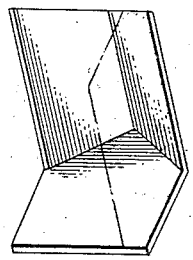
Figure 11:
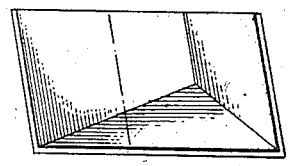
Figure 13:
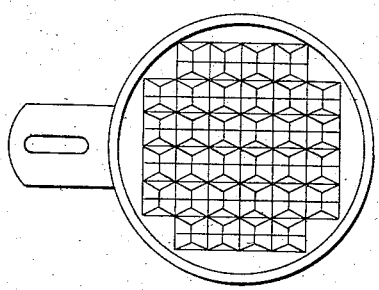
Figure 12:
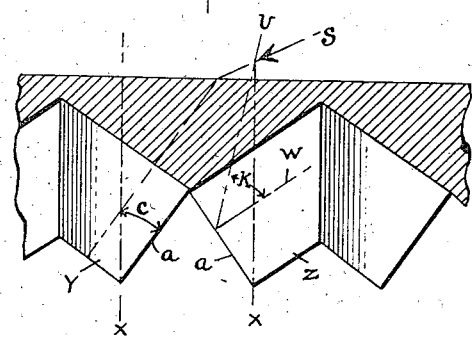

The drawings illustrate embodiments of the invention and the views therein are as follows:

Figure 1 is a rear view of a pressed glass reflector showing units of my invention arranged in repeated order, Figure 2 is a vertical sectional view of the same on the line 2—2 of Figure 1, Figure 3 is a cross-sectional view of the same on the line 3—3 of Figure 1, Figure 4 shows a fragmentary cross-section of the reflector of Figure 1 in dotted lines upon a like section in full lines of a reflector having its triangular reflecting surfaces at an angle of 45° with the construction axis, and illustrates the decrease in thickness of the pressed glass reflector which may be accomplished by the present invention, and when making the angle between the axis and the triangular surface less than 35°, Figure 5 shows one of the units of my improved reflector and the sides thereof in development, Figures 6, 7 and 8 are perspective views, respectively, of a central triple reflector, a triple reflector with a rectangular orifice, and a reflector embodying the present invention, and illustrate each of said reflectors placed at the same angle from the normal, Figures 9, 10 and 11 illustrate, respectively, the same reflectors as Figures 6, 7 and 8, and show views looking directly into the orifices of the reflectors from the angle indicated in Figures 6, 7 and 8, and in each of these figures the reflective area has been indicated by dotted lines, Figure 12 is a fragmentary cross-sectional view illustrating how the lateral range of a reflector may be increased, and Figure 13 indicates a safety tail-light for a vehicle made fom glass according to the present invention.

The reflector shown in Figure 1 is composed of units identical with the central figure of Figure 5. Each of these units consists of three reflecting surfaces, the one surface $a$ being in the form of an isosceles right triangle, the other surfaces $b$ being trapezoids. In Figure 1 one of these units has been emphasized by heavy black lines.

A plurality of these units is arranged in parallel form to form a row, the trapezoidal surfaces $b$ of each unit being arranged contiguous with the trapezoidal surfaces of the adjacent unit, and the triangular surfaces $a$ of all the units in each row being in the same plane.

In order to build up an area in the other dimension, a plurality of these rows is arranged contiguously, the base of the triangular surface of each unit being contiguous to the base of the triangular surface of its neighbor, and the trapezoidal surfaces of each row being contiguous with the trapezoidal surfaces of the adjacent rows.

This will be readily understood from a careful examination of Figures 1 and 5 taken in connection with Figures 2 and 3.

As already stated, the form of a true central triple reflector is that of three sides and the corner of a cube. The diagonal of the cube is the axis of the reflector. Each of the sides makes an angle with the axis of 35° 16'.

The orifice of a central triple reflector is a regular hexagon. A triple reflector with a rectangular orifice, such as shown in my Patent No. 1,552,166, above mentioned, lends itself more readily to changes in design and the molds for pressing it are easier to make and less costly than those necessary for the central triple reflector.

The axis of a triple reflector passes through the joining point of the three surfaces of the unit. The direction of the axis may be varied indefinitely. However, in order to design a triple reflector so that all of the three surfaces will be illuminated by light from a source on its axis, there is this condition to be met, viz: when the orifice is projected on a plane at right angles to the axis, then opposite points on the boundary of the orifice must be equidistant from the axis. This axis may be considered as the construction axis, or in case of a glass reflector, having a front flat face, the normal to that front face.

The design of a triple reflector is simplified if the construction axis lies in a plane passing through the joining line of two of its surfaces and bisecting the angle between those surfaces. The angle between the construction axis and the third surface is determined by practical considerations. To be perfect, the projection of the orifice of a triple reflector on a plane at right angles to the construction axis must be symmetrical about the axis as a center, and the joining line of a pair of surfaces as a centerline.

While there is a limit to the thinness, with which it is practical to make pressed glass reflectors, the present type of central triple reflectors and triple reflectors with rectangular orifices are excessive in thickness where good, clean, sharp cut angles are produced.

In order that the method of reducing the thickness of the pressed glass reflectors according to this invention may be readily understood, reference may be had to Figure 4, which shows a section through a portion of a reflecting panel where the angle $c$ is 45°, that is, the angle between the axis and the triangular surface $f$.

In the dotted section, made according to the present invention, the corresponding angle $c'$ is 30°. The width of the reflecting surface $d$ is equal to the width of the reflecting surface $d'$. It will, however, be apparent that the thickness $t'$ is much less than the thickness $t$.

This clearly demonstrates that with a given width of reflecting surface, the thickness of the glass can be materially decreased by decreasing the angle $c$ between the construction axis and the right triangular surface $a$.

The thinnest practical glass results in the least cost of labor, materials, freight, etc., and the least absorption of light.

Let us, for the sake of illustration, assume that in the following cases the width of the reflecting surfaces is constant 0.25" and we change the angle $c$ to ascertain just how that change affects the thickness of the reflector glass.

| Angle $c$ | Necessary thickness of glass |
|---|---|
| 45° | .437" |
| 35° 16' | .351" |
| 30° | .320" |
| 22° 30' | .282" |

Referring now to Figures 6–11 inclusive, "A" represents the axes. Angle $g$ represents the angle between the axis and one surface in a horizontal plane. $h$ represents an entering ray of light, and $j$ represents the angle between the axis "A" and the entering ray of light $h$, and in the cases shown in Figures 6–8, this angle is 20°.

If light enters any one of these three reflector units, parallel with the axis, it will be reflected back toward the source of light, and in that case, the entire unit will be illuminated.

When, however, the light enters along the line $h$, only a portion of that entering light will be reflected toward its source.

Figures 9, 10 and 11 illustrate the reflective areas, the dotted part accurately showing that reflected area.

The hexagonal orifice of the central triple reflector of Figure 9 and the extended surface of the reflector with the rectangular orifice, Figure 10, greatly decrease the effective reflection, the latter not, however, as much as the former.

With the form of reflector, however, shown in Figure 11, i. e., the reflector of this invention, this loss is entirely eliminated.

Without taking into consideration the light loss just referred to, the area of reflection (those parts included in dotted lines) of light entering parallel with $h$ has the same ratio to the normal area of reflection, that is, the normal area of the orifice, as sine "$g-j$" has to sine "$g$". As angle $g$ increases, this ratio increases. Angle $g$ may be increased by decreasing angle $c$ of Figure 4.

To illustrate what effect a change in angle $c$ has, the following table will be illuminative. In the following table angle $j$ in each instance equals 20°.

| Angle $c$ | | Angle $g$ | | Effective reflecting area | | |
|---|---|---|---|---|---|---|
| | | | | Percent of most efficient reflecting area | | |
| Degrees | Minutes | Degrees | Minutes | Figure 9 | Figure 10 | Figure 11 |
| 45 | 00 | 35 | 16 | | | 46 |
| 35 | 16 | 39 | 14 | 47 | 41 | 52 |
| 30 | 00 | 40 | 53 | | | 54.5 |
| 22 | 30 | 42 | 45 | | | 57 |

There is another benefit derived from the flexibility of angle $c$. In Figure 12, light originating to the right of construction axis $x$ and entering reflector unit $y$ will be reflected back toward its source until the angle from the normal reaches the position of ray $s$ parallel within the glass to surace $a$.

At this point, due to surface refraction, the angle between the construction axis $x$ or the normal to the reflector and ray of light $s$, without the glass, may exceed 60°, an angular range entirely unnecessary as 30° is as great an angular range as is ordinarily required.

At the same time, a light ray $u$ entering unit $z$ and making an angle with the normal $w$ to surface $a$, less than the critical angle $k$, will pass through surface $a$ and not be reflected at all, the lateral range being even less than 10°.

This great difference between the reflecting values of the reversed units may be corrected by decreasing angle $c$, as illustrated in the following table:

*Angle between construction axis $x$ and light ray*

| Angle $c$ | | Light ray $u$ | | | | Light ray $s$ | | | |
|---|---|---|---|---|---|---|---|---|---|
| | | Within the glass | | Without the glass | | Within the glass | | Without the glass | |
| Degrees | Minutes | Degrees | Minutes | Degrees | Minutes | Degrees | Minutes | Degrees | Minute |
| 35 | 00 | 10 | 00 | 14 | 30 | 35 | 00 | 56 | 50 |
| 30 | 00 | 15 | 00 | 22 | 00 | 30 | 00 | 46 | 30 |
| 22 | 30 | 22 | 30 | 33 | 45 | 22 | 30 | 33 | 45 |

In calculating the above, 1.45 was assumed to be the index of refraction and 45° the critical angle $k$.

It will, therefore, be seen that when angle $c$ is 22° 30', both units $y$ and $z$ have the same lateral range of reflection and all the units in a reflecting panel cease to reflect at the same time.

It will, therefore, be readily seen that with the improved reflector disclosed herein that the reflective value, particularly at an angle from the normal, is greatly increased; that the glass may be made much thinner than reflector glass used at the present time, and that the units themselves may be much smaller.

Of course, the reflector glass illustrated may be modified in various ways without departing from the invention herein set forth and hereafter claimed.

The invention is hereby claimed as follows:

1. A triple reflector having one surface in the form of an isosceles right triangle, the other two surfaces being trapezoids, and each of the surfaces being at right angles to each other.

2. A reflector for returning a beam of light to its source, comprising an area built up of a plurality of three-surface reflecting units arranged contiguously and parallel, one of the surfaces of each unit being an isosceles right triangle, and the other two being trapezoids, and each of the surfaces being at right angles to the other two surfaces.

3. A reflector made according to claim 2 having means for coloring the reflected light.

4. A reflector for returning a beam of light to its source, comprising an area built up of a plurality of three-surface reflecting units arranged contiguously and parallel, one of the surfaces of each unit being an isosceles right triangle, and the other two being trapezoids, and each of the surfaces being at right angles to the other two surfaces, the triangular surfaces and the trapezoidal surfaces of each unit being arranged contiguously with the triangular surfaces and the trapezoidal surfaces, respectively, of adjacent units.

5. A reflector made according to claim 4 having means for coloring the reflected light.

6. A reflector for returning a beam of light to its source, comprising a pressed glass plate area built up of a plurality of three-surface reflecting areas arranged contiguously and parallel, one of the surfaces of each unit being an isosceles right triangle and the other two being trapezoids, and each of the surfaces being at right angles to the other two.

7. A reflector for returning a beam of light to its source, comprising a pressed glass plate area built up of a plurality of three-surface reflecting units arranged contiguously and parallel, one of the surfaces of each unit being an isosceles right triangle and the other two being trapezoids, and each of the surfaces being at right angles to the other two, the triangular surfaces and the trapezoidal surfaces of each unit being arranged contiguously with the triangular surface and the trapezoidal surface, respectively, of adjacent units.

8. A reflector comprising a plurality of triple reflector units, the surfaces of each unit being at right angles to one another and forming an aperture symmetrical about the construction axis of the unit, one surface of each unit being so placed that the angle between the construction axis and said surface is between 22 and 35 degrees.

9. A reflector made according to claim 8 having means for coloring the reflected light.

10. A reflector comprising a plurality of triple reflector units, the surfaces of each unit being at right angles to one another and forming a rectangular aperture symmetrical about the construction axis of the unit, one surface of each unit being so placed that the angle between the construction axis and said surface is between 22 and 35 degrees.

11. A reflector comprising a plurality of triple reflector units, each unit consisting of a single surface opposed and at right angles to a pair of surfaces at right angles to each other, and the aperture of each unit being symmetrical about the construction axis of the unit, the single surface being so placed that the angle between the single surface and the construction axis is between 22 and 35 degrees.

12. A reflector as described in claim 11 wherein the single surface of the unit is contiguous with the single surface of an adjoining unit.

CLEVELAND A. JAMES.